US007882169B1

(12) United States Patent
Droms et al.

(10) Patent No.: US 7,882,169 B1
(45) Date of Patent: Feb. 1, 2011

(54) METHOD AND APPARATUS FOR CONFIGURING RELAY PROCESSES USED FOR DYNAMICALLY CONFIGURING HOSTS IN NETWORK COMMUNICATIONS

(75) Inventors: Ralph Droms, Westford, MA (US); Erik De Kegel, Wetteren (BE)

(73) Assignee: Cisco Technology, Inc., San Jose, CA (US)

( * ) Notice: Subject to any disclaimer, the term of this patent is extended or adjusted under 35 U.S.C. 154(b) by 1170 days.

(21) Appl. No.: 10/372,431

(22) Filed: Feb. 13, 2003

(51) Int. Cl.
*G06F 15/16* (2006.01)
(52) U.S. Cl. ................. 709/203; 709/223; 709/238
(58) Field of Classification Search ........... 709/203, 709/223, 225, 227, 238, 250
See application file for complete search history.

(56) References Cited

U.S. PATENT DOCUMENTS

| 6,073,178 | A  | * | 6/2000  | Wong et al. ............. 709/229 |
| 6,311,218 | B1 |   | 10/2001 | Jain et al. |
| 6,667,971 | B1 | * | 12/2003 | Modarressi et al. ...... 370/352 |
| 6,901,079 | B1 | * | 5/2005  | Phadnis et al. .......... 370/466 |
| 6,977,922 | B2 | * | 12/2005 | Blanset et al. .......... 370/352 |
| 7,047,304 | B2 | * | 5/2006  | Senapati et al. ......... 709/229 |
| 7,065,071 | B2 | * | 6/2006  | Fujita ................. 370/352 |
| 7,079,527 | B2 | * | 7/2006  | Owens ................. 370/352 |

2004/0128367 A1 * 7/2004 Piercy et al. ............ 709/220

OTHER PUBLICATIONS

B. Patel et al, Dynamic Host Configuration Protocol (DHCPv4) Configuration of IPsec Tunnel Mode, pp. 1-13, Jan. 2003.*
R. Droms, "Dynamic Host Configuration Protocol", Mar. 1997, pp. 1-45.
S. Alexander et al., "DHCP Options and BOOTP Vendor Extensions", Mar. 1997, pp. 1-34.

* cited by examiner

*Primary Examiner*—William C Vaughn, Jr.
*Assistant Examiner*—Scott Christensen
(74) *Attorney, Agent, or Firm*—Hickman Palermo Truong & Becker LLP (57) ABSTRACT

Techniques for configuring relay processes for dynamically configuring hosts for network operations include receiving, at a relay process on a network device, a first message from a first server that dynamically configures hosts for network communications. The first message includes first data that indicates a particular set of one or more network addresses for servers that dynamically configure hosts for network communications. The particular set is stored for use in directing second data to a server that dynamically configures hosts for network communications. The second data is received in a second message from a client on a host connected to the network device. The second data indicates a host request for configuring the host for network communications. These techniques allow a Dynamic Host Configuration Protocol (DHCP) relay agent on a router to be automatically configured with a set of addresses for DHCP servers.

33 Claims, 6 Drawing Sheets

METHOD AND APPARATUS FOR CONFIGURING RELAY PROCESSES USED FOR DYNAMICALLY CONFIGURING HOSTS IN NETWORK COMMUNICATIONS

FIELD OF THE INVENTION

The present invention generally relates to dynamically configuring hosts for network operations. The invention relates more specifically to configuring relay agents for dynamically configuring hosts for network communications.

BACKGROUND OF THE INVENTION

The approaches described in this section could be pursued, but are not necessarily approaches that have been previously conceived or pursued. Therefore, unless otherwise indicated herein, the approaches described in this section are not admitted to be prior art simply by inclusion in this section.

A computer network typically includes computer processors or "hosts" that host software applications that provide or request network services, or both. The hosts may be network terminals or end stations that do not perform network traffic routing or forwarding functions. The hosts communicate with each other through network devices, also called intermediate devices, such as switches and routers, which do perform routing and forwarding functions. Some intermediate devices are themselves hosts for some routing or forwarding applications and services. The Internet Protocol (IP) is often used for sending packets of information between processes running on hosts on a network. As used hereinafter, a server refers to a server process that provides a service and a client refers to a client process that requests a service, unless otherwise indicated to refer to the host or device on which the process executes. According to the Internet Protocol (IP), different hosts have different logical addresses, called IP addresses, which are used by the intermediate devices to route and forward data packets from one host to another.

A local area network (LAN) connects hosts in a relatively small geographic area for sharing resources. Resources shared on the LAN often include data files, devices such as printers, and applications such as word processors. LAN protocols function at the level of the physical connection between devices on the LAN, and the data link between the connection and the operating system on a device. In contrast, IP functions at the level where client and server processes send or receive data directed to each other. Intermediate devices on LANs that forward packets on the basis of their built-in, media access control (MAC) addresses are called switches. Intermediate devices that forward packets on the basis of administratively assigned, topologically relevant, IP addresses are called routers.

After obtaining access to the network through a physical port, a host must be configured for network operations. For example, a newly added host is assigned a logical network address for itself, and a network address for the intermediate device that routes or forwards its traffic, among other configuration information. Configuring a host is a tedious process to perform manually.

The Dynamic Host Configuration Protocol (DHCP) provides a mechanism through which computers using IP can obtain network addresses and other configuration information automatically. DHCP is an open standard protocol for dynamic host configuration described in request for comments (RFC) documents numbered 2131 and 2132 available at the time of this writing as rfc2131.txt and rfc2132.txt, respectively, on the worldwide web (www) at domain and directory ietf.org/rfc. A DHCP server process operates on a DHCP server host that is conveniently located for several hosts, which hosts are on one or more local networks. One or more DHCP server hosts and processes are set up by a system administrator with information to configure the hosts on one or more local networks to reflect the current architecture of those local networks. A DHCP client process operates on each host of the local networks.

When a host begins operations on the local network, the DHCP client on that host requests configuration information from one of the DHCP servers. In response to the request from the DHCP client, one or more of the DHCP servers respond with configuration information to be used by the host of the DHCP client for a pre-determined period of time ("lease time"), including an IP address for the host of the DHCP client. Such responses take the form of "offers" of data. The DHCP client notifies the servers that one of the offers is accepted. The host that is executing the DHCP client then uses the configuration information including the address. The configuration information is bound to the particular DHCP client, and the binding is recorded by the DHCP server that offered it.

A DHCP relay agent is a process that executes on an intermediate device to forward DHCP messages between DHCP client and DHCP server. The DHCP relay agent facilitates communications with the DHCP client before the DHCP client's host is bound to a particular IP address. The DHCP relay agent is used when the DHCP client cannot broadcast directly to the DHCP server because it is separated from that DHCP server by network routing elements. In this case, the DHCP relay agent on the router closest to DHCP client receives a broadcast to port 67 and then forwards the DHCP client's packet to all DHCP servers for which the relay agent is configured. In this way, the DHCP client can broadcast locally and still make contact with one or more DHCP servers.

Each DHCP relay agent must be configured with the network addresses of one or more DHCP servers to which the DHCP relay agent forwards requests from DHCP clients. However, the current DHCP specification includes no mechanism for configuring DHCP relay agents with such addresses. A network administrator must manually configure a relay agent with the addresses of one or more DHCP servers.

Manual configuration involves: 1) determining network addresses of appropriate DHCP servers; 2) contacting the network device that hosts the relay agent, typically using a terminal interface over TELNET, or by a direct console connection to a port of the device; and 3) issuing one or more network operating system commands to store the IP addresses of one or more DHCP servers in a data structure on the host for the DHCP relay agent. The specific required operating system command often depends on the vendor or type of the network device that hosts the relay agent. The data structure may reside in the memory of the host for the relay agent and can be lost when that host loses power. Different vendor or types of network devices that implement relay agents often use different formats and names for the data structures that store the list of addresses of DHCP servers.

Thus, there are several disadvantages to manually configuring DHCP relay agents. For example, intermediate devices that host the relay agents may be of a variety of types or produced by a variety of vendors; consequently, the hosts for the relay agents may use a variety of operating systems. Therefore, the network administrator may have to use different commands to perform the same function on different intermediate devices. This renders configuring each device that hosts a relay agent a tedious and error prone task. Further, the network administrator may have to enter the same IP address for a DHCP server multiple times for multiple intermediate devices that host relay agents. This involves repeating those DHCP server addresses while configuring each intermediate device, rendering the configuration a repetitious and error prone task. Another disadvantage is that, in a large network, there may be a large number of hosts for relay agents. Therefore, the tedious and repetitious task must be performed a large number of times, increasing the chances for error.

Another disadvantage of manual configuration is excessive delays. When a new intermediate device that hosts a relay agent is connected to the network, the hosted relay agent is unable to perform as a relay agent until the data structure includes the list of DHCP servers. This delay between the time when the relay agent host is connected to the network and the time when the data structure includes the list of addresses for DHCP servers is termed "dead time." When the set of DHCP servers changes, due to adding a new DHCP server or removing an existing DHCP server, the list of DHCP servers at a relay agent is out of date and should be revised. The relay agent may be unable to perform correctly until the data structure includes the revised list of DHCP servers. The delay between the time when the set of DHCP servers changes and the time when the data structure includes the correct list of addresses for DHCP servers is termed "revision time." Using manual configuration of relay agents, the delays may be minutes or hours or even days, depending on the work load of the network administrator and the complexity of the network. It would be preferable were the delays to be only a few seconds.

Based on the foregoing, there is a clear need for techniques to configure relay agents that do not suffer the disadvantages of current techniques. In particular, there is a need for using DHCP messages to automatically configure DHCP relay agents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for configuring relay processes for dynamically configuring hosts for network operations. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Structural Overview
   2.2 Functional Overview
3.0 Method of Configuring a Relay Process
   3.1 Method at Host Configuration Relay Process
   3.2 Method at Host Configuration Server
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method for configuring relay processes for dynamically configuring hosts for network operations. A first message is received at a relay process on a network device from a first server that dynamically configures hosts for network communications. The first message includes first data that indicates a particular set of one or more network addresses for servers that dynamically configure hosts for network communications. The particular set is stored for use in directing second data to a server that dynamically configures hosts for network communications. The second data is received in a second message from a client on a host connected to the network device. The second data indicates a host request for configuring the host for network communications.

According to another aspect, a method of configuring relay processes for dynamically configuring hosts for network operations includes receiving at a first server a first message from a first relay process on a network device. The server determines a particular set of one or more network addresses of servers that dynamically configure for network communications hosts that are connected to the first network device. A second message is sent from the first server to the first relay process. The second message includes second data that indicates the particular set of one or more network addresses.

In other aspects, the invention encompasses a computer apparatus and a computer readable medium configured to carry out the foregoing steps.

Embodiments of one or more of these aspects of the invention allow a DHCP relay agent on a router to be automatically configured with a set of addresses for DHCP servers.

2.0 Structural and Functional Overview

Illustrated embodiments of the invention are described in the following sections in the context of the Dynamic Host Configuration Protocol (DHCP); however, embodiments are not limited to this context. In other embodiments, other protocols may be used. For example, other protocols that configure hosts for network operations in which an intermediate "relay" process is employed to intercede between a client on a host to be configured and one or more arbitrarily located configuration servers may use embodiments of the invention. In the context of such a protocol, embodiments of the invention configure the relay process with information about the network addresses of the one or more arbitrarily located configuration servers.

2.1 Structural Overview

Figure 1:
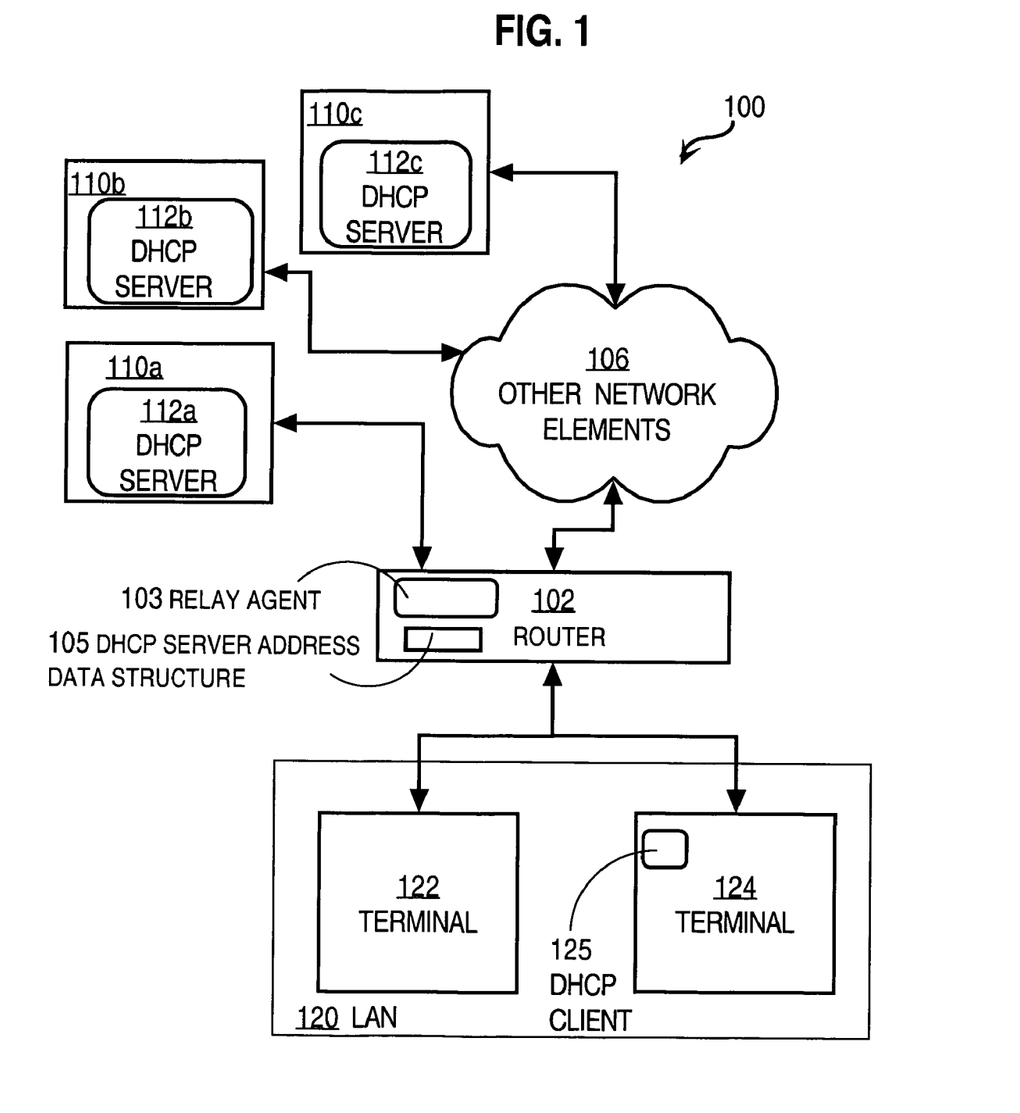
FIG. 1 is a block diagram that illustrates a network with a host configuration relay process, according to an embodiment.

FIG. 1 is a block diagram that illustrates a network 100 with a host configuration relay process, according to an embodiment. Network 100 includes a local area network (LAN) 120 that includes terminal devices 122, 124. In other embodiments, more or fewer terminals and switches are included in LAN 120 and the network includes more or fewer LANs. LAN 120 is connected to router 102, which is connected to zero or more other network elements 106.

According to DHCP, a network includes one or more DHCP servers on one or more DHCP server hosts. For example, network 100 includes three hosts 110a, 110b, 110c, collectively referenced hereinafter as DHCP hosts 110, for three DHCP servers 112a, 112b, 112c, respectively, collectively referenced hereinafter as DHCP servers 112. Although shown in FIG. 1 as residing on separate hosts, in other embodiments two or more DHCP servers 112 may reside on the same DHCP server host 110. In other embodiments, more or fewer DHCP servers 112 on corresponding hosts 110 are included on a network.

According to DHCP, each host to be configured includes a DHCP client. For example terminal 124 includes DHCP client 125. According to DHCP, a network device disposed between a DHCP client and a DHCP server includes a DHCP relay agent. For example, router 102 includes relay agent 103. In many embodiments of a DHCP relay agent, a DHCP server address data structure is stored on the host for the DHCP relay agent for storing data that indicates the IP addresses of the DHCP servers. For example, DHCP server address data structure 105 is stored on the router 102 that hosts DHCP relay agent 103. The address for a particular DHCP server 112 is the IP address of the host 110 that includes the particular server 112. For example, the address for DHCP server 112a is the IP address of the host 110a.

Although the data structure 105 is shown outside the relay agent 103, in some embodiments, the data structure is included within resources of router 102 that are dedicated to the relay agent. In such embodiments, data structure 105 may be depicted inside the relay agent 103.

According to DHCP, when a host is to be configured for network operations, the host communicates with one or more DHCP servers using DHCP messages. When the host to be configured is not connected directly to a DHCP server host, a relay agent on a network device connected to the host to be configured is involved in the communications with the DHCP servers. For example, when terminal 124 is to be configured, relay agent 103 on a router 102 connected to the terminal is involved in the communications between the terminal and one or more of the DHCP servers 112.

Figure 2:
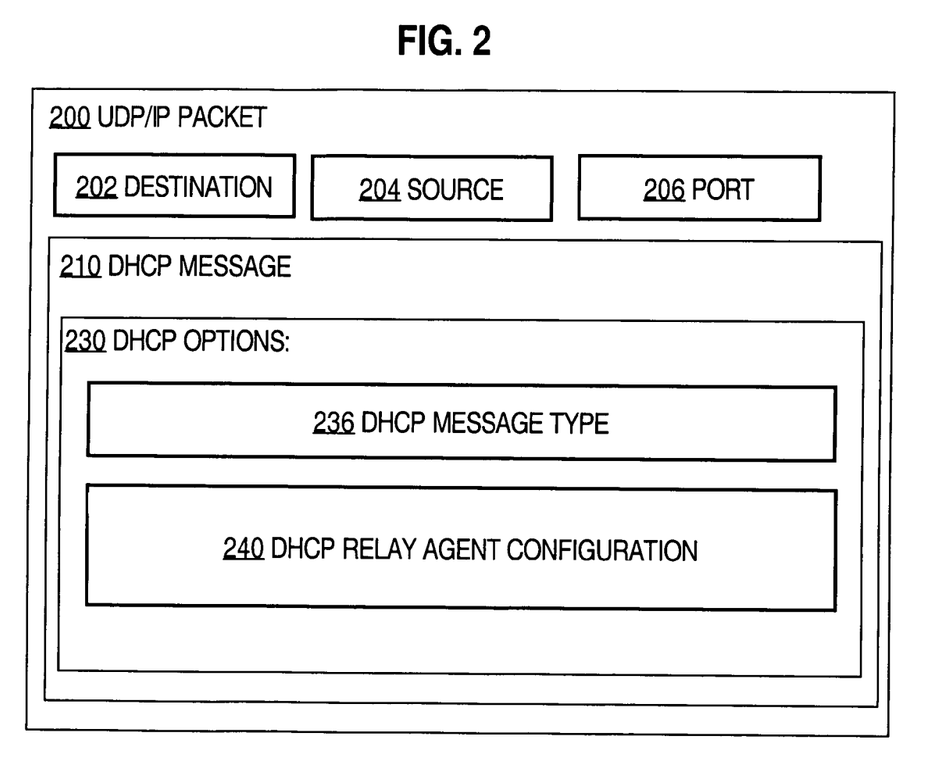
FIG. 2 is a block diagram that illustrates a Dynamic Host Configuration Protocol (DHCP) message, modified according to an embodiment.

FIG. 2 is a block diagram that illustrates a Dynamic Host Configuration Protocol (DHCP) message, according to an embodiment. DHCP messages are included in User Datagram Protocol data packets that are transported over Internet Protocol networks ("UDP/IP packets"). UDP/IP packets include a destination field 202 and a source field 204 and a port field 206. The destination field holds data indicating the IP address of the intermediate device or terminal that is to receive the UDP/IP packet. Routers efficiently transmit UDP/IP packets using hardware configured to interpret the destination address in destination field 202. The source field 204 holds data indicating the IP address of the intermediate device or terminal that sent the UDP/IP packet. The port field 206 holds data that indicates a particular process executing on the host at the destination IP address.

The UDP/IP packet includes payload data that is not used by UDP/IP to transfer packets. The illustrated embodiment includes a DHCP message 210 in the data payload. A DHCP message 210 includes a set of fields used in an earlier protocol for passing IP addresses, and a set of fields in a DHCP options portion 230 of the DHCP message. The fields of the earlier protocol are not shown.

The fields in the DHCP options portion include the DHCP message-type field 236, among others. The DHCP message-type field 236 holds data that indicates the type of message, such as an initial discovery request (a "DHCPDISCOVER" message type) and a renewal request (a "DHCPREQUEST" type), and the response with an offer (an "DHCPOFFER" type), and replies to requests (a "DHCPACK" type), among others. Other fields of the DHCP options portion 230 are not shown, but are apparent from review of RFC 2131 and RFC 2132.

According to some embodiments, a message type is defined for exchanging configuration information among DHCP servers and DHCP relay agents. For purposes of illustration, it is assumed that this message type is a "DHCPINFORM" type. The name or label of the message type is not critical, and a different label may be used for a functionally equivalent message type.

The DHCP options portion 230 includes a DHCP relay agent configuration option portion 240. According to some embodiments, a DHCP relay agent configuration option is added to carry DHCP server addresses to a relay agent, as described in more detail below. The option is specified according to the DHCP for specifying options in a DHCP message. The relay agent configuration option 240 includes data that indicates the IP addresses for the DHCP servers

2.2 Functional Overview

According to the illustrated embodiments, relay agent 103 automatically obtains the DHCP server addresses to store in data structure 105 from one or more DHCP servers 112 through one or more DHCP messages. No intervention by a network administrator is required; therefore the relay agent 103 is configured for supporting DHCP without the delays, tedium, errors or other disadvantages of conventional techniques. In other embodiments, other intermediate processes automatically obtain configuration server addresses to store in one or more data structures from one or more configuration servers.

Figure 3:
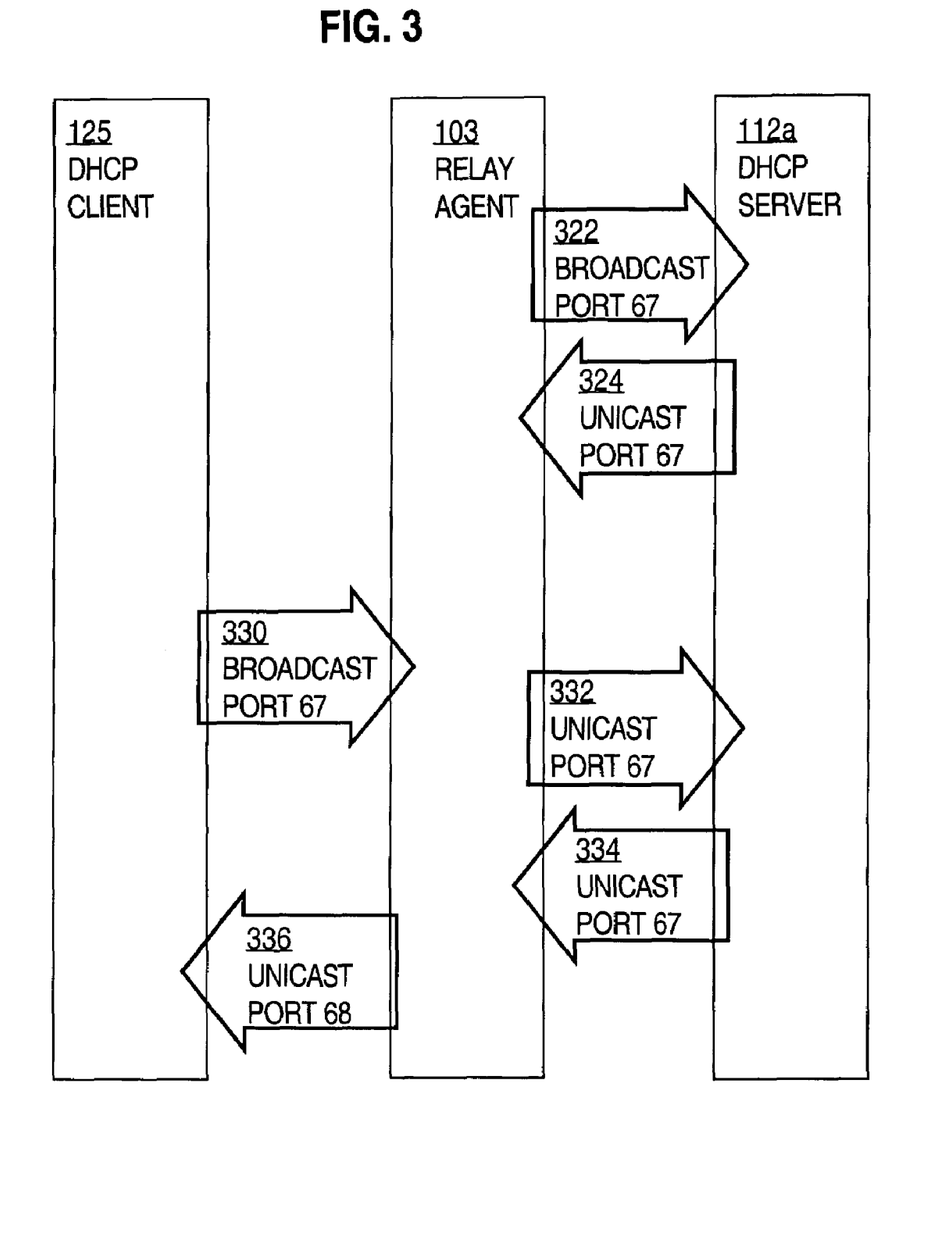
FIG. 3 is a time line diagram that illustrates a sequence of messages exchanged with a relay process, according to an embodiment.

FIG. 3 is a time line diagram that illustrates a sequence of DHCP messages exchanged with a relay process, according to an embodiment. In the illustrated embodiment, at time t0, relay agent 103 begins to operate with no information in the DHCP server address data structure 105. DHCP relay agent 103 seeks to find the addresses of one or more DHCP servers 112 so that the relay agent can pass DHCP messages from terminals on LAN 120.

At time t1, relay agent 103 broadcasts a DHCP message of message type "DHCPINFORM." For example, data that indicates a broadcast is included in destination field 202; data that indicates port "67" is included in port field 206; and data that indicates message type "DHCPINFORM" is included in DHCP message type field 236. Port 67 notifies a receiving device that the message is for a DHCP server or relay agent executing on the device. Any device receiving a broadcast message sends the payload of the message to a process, if any, associated with the port in the port field 206. Thus, any DHCP server or DHCP agent executing on the receiving device receives the payload of the DHCP message.

The message is broadcast to all devices connected to the router 102 that hosts the relay agent 103. In the illustrated embodiment, router 102 is connected directly to host 110a for DHCP server 112a; therefore, server 112a receives the DHCPINFORM message. In the illustrated embodiment, router 102 is not directly connected to hosts 110b, 110c for DHCP servers 112b, 112c; therefore these servers do not receive the broadcast DHCPINFORM message. However, if any of the other network elements 106 to which router 102 is directly connected includes a configured DHCP relay agent, that configured DHCP relay agent will forward the message in a unicast to each of one or more DHCP servers, such as DHCP servers 112b, 112c. The configured DHCP relay agent sends a unicast by placing the address of corresponding host 110b or host 110c in the destination field 202 instead of the data that indicates a broadcast. The configured DHCP relay agent obtains the address of corresponding hosts 110b, 110c from its own DHCP server address data structure.

At time t2, the DHCP payload in message 322 broadcast by the relay agent 103 is received at a DHCP server 112. The DHCPINFORM message indicates to any receiving DHCP server that the relay agent, which sent the message, is requesting configuration information. For example, the data that indicates a DHCPINFORM message type in message type field 236 indicates to DHCP server 112a that relay agent 103 on router 102 is requesting information about the set of DHCP servers on network 100. Similarly, if configured relay agents on devices connected to router 102 forward the DHCP message to DHCP servers 112b, 112c, the data that indicates a DHCPINFORM message type indicates to the DHCP servers that relay agent 103 on router 102 is requesting information about the set of DHCP servers on network 100.

One of the DHCP servers determines one or more addresses of DHCP servers on the network. For example, DHCP server 112a determines a set of one or more addresses of DHCP servers 112 on network 100. Any known method may be used to determine the addresses. According to some embodiments, a network administrator enters data that indicates the set of addresses for one or more DHCP servers at one or more of those DHCP servers, and that data is stored at each DHCP server. In some embodiments the DHCP servers send DHCP messages to each other to share data indicating the set of addresses.

At time t3, in response to receiving the DHCPINFORM message, the DHCP server generates and sends a DHCP message of type DHCPACK in a unicast to the relay agent (e.g., data indicating the IP address of the relay agent in destination field 202 and data indicating port 67 in the port field 206 of the UDP/IP data packet). In a DHCPACK message, the contents of the DHCP message type field 236 indicate a DHCPACK type message. For example, DHCP server 112a sends a DHCPACK message in a unicast 324 to relay agent 103.

The DHCPACK message includes data that indicates at least one address of one DHCP server on the network. In the illustrated embodiment, the DHCPACK message includes, in relay agent configuration option 240, data indicating the IP addresses of the hosts 110a, 110b, 110c for the DHCP servers 112a, 112b, 112c, respectively. In other embodiments, each DHCP server sends a DHCPACK message without the relay agent configuration option 240. In such embodiments, the IP address of one host 110 of one DHCP server 112 is available in the source field 204 of the UDP/IP data packet for the server that sent the DHCPACK message.

At time t4, the DHCP relay agent receives the DHCPACK message and extracts the addresses of one or more hosts for DHCP servers and stores data indicating those addresses in a DHCP server address data structure. In the illustrated embodiment, DHCP relay agent 103 extracts the addresses of hosts 110a, 110b, 110c from the relay agent configuration option 240 and stores data indicating those addresses in DHCP server address data structure 105. If a relay agent configuration option 240 is absent from the DHCPACK message, or contains no server addresses, then the relay agent extracts the address of one host for one DHCP server from the source field 204 and stores data indicating that address into the DHCP server address data structure.

After time t4, the relay agent is configured for relay agent operations according to DHCP. For example, at time t5 the relay agent 103 receives a DHCPDISCOVER message in a broadcast 330 from DHCP client 125 on terminal 124. Although shown in FIG. 3 as received after unicast 324, in other embodiments the broadcast 330 may be received before unicast 324 is received at the relay agent. The DHCPDISCOVER message indicates that terminal 124 is to be configured for network communications and needs an IP address as well as other network configuration information.

At time t6, relay agent 103 forwards a DHCPDISCOVER message, based at least in part on the DHCPDISCOVER received from the client, in one or more unicasts to one or more of the addresses in the DHCP server address data structure 105. In the illustrated embodiment, the relay agent 103 forwards the DHCPDISCOVER message in a unicast to the address of host 110a, where the message is received by DHCP server 112a.

In response, at time t7, the DHCP relay agent receives one or more DHCPOFFER messages from one or more of the DHCP servers 112 at those addresses to which the DHCPREQUEST message was unicast. In the illustrated embodiment, the relay agent 103 receives a DHCPOFFER messages from DHCP server 112a.

At time t8, the relay agent sends a DHCPOFFER message, based at least in part on the DHCPOFFER message received from the DHCP server, to the DHCP client in a unicast with data indicating port 68 in the port field 206. Port 68 indicates that the process on the destination host is a DHCP client. In the illustrated embodiment, the relay agent 103 sends a DHCPOFFER message to the DHCP client 125.

In some embodiments, after the DHCP relay agent is configured by the process described above with reference to FIG. 3, the relay agent is reconfigured with a different set of addresses. This may occur, for example, after all DHCP servers 112 have been deleted from one host, or a different device hosts its first DHCP server.

In some such embodiments, the DHCP relay agent receives an unsolicited DHCPACK message. For example, relay agent 103 receives unicast 324 without having first sent broadcast 322. In response to receiving the unsolicited DHCPACK message, the relay agent replaces any addresses indicated by data in the DHCP server address data structure with addresses indicated by data received in the relay agent configuration option 240. If no data is in the relay agent configuration option 240, then the relay agent inserts, into the DHCP server address data structure, data indicating the address in the source field 204.

In some such embodiments, the DHCP relay agent receives DHCPACK message with a relay agent configuration option in response to some other DHCP message. For example, relay agent 103 receives a DHCPACK message in unicast 334 in response to the DHCPDISCOVER message sent in broadcast 332. In response, the relay agent replaces any addresses indicated by data in the DHCP server address data structure with addresses indicated by data received in the relay agent configuration option 240.

In other such embodiments, the relay agent receives a DHCPFORCERENEW message instructing the relay agent to broadcast a DHCPINFORM message, like broadcast 322, to start the process described above with reference to FIG. 3.

3.0 Method of Configuring a Relay Process

Figure 4A:
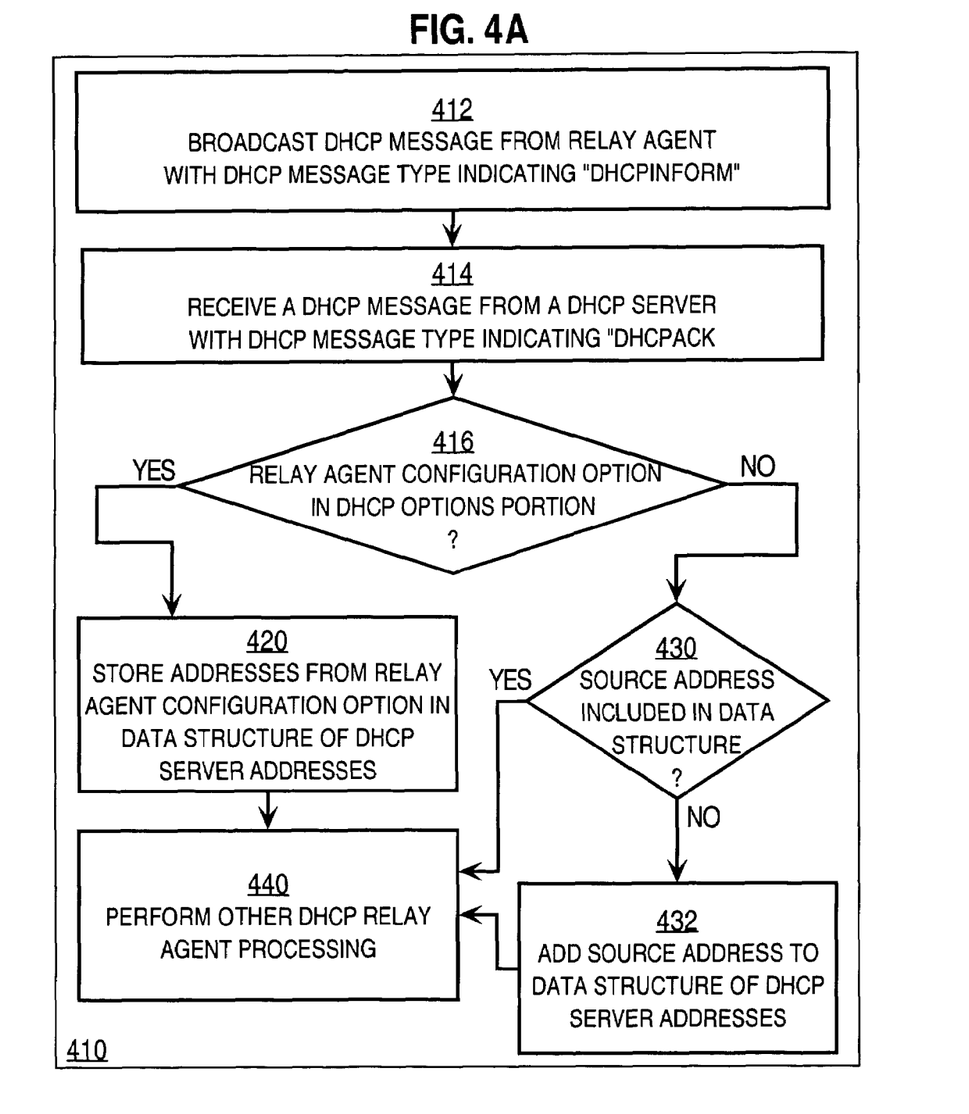
FIG. 4A is a flow diagram that illustrates an embodiment of a method for configuring a relay process of a host configuration protocol at the relay process.
Figure 4B:
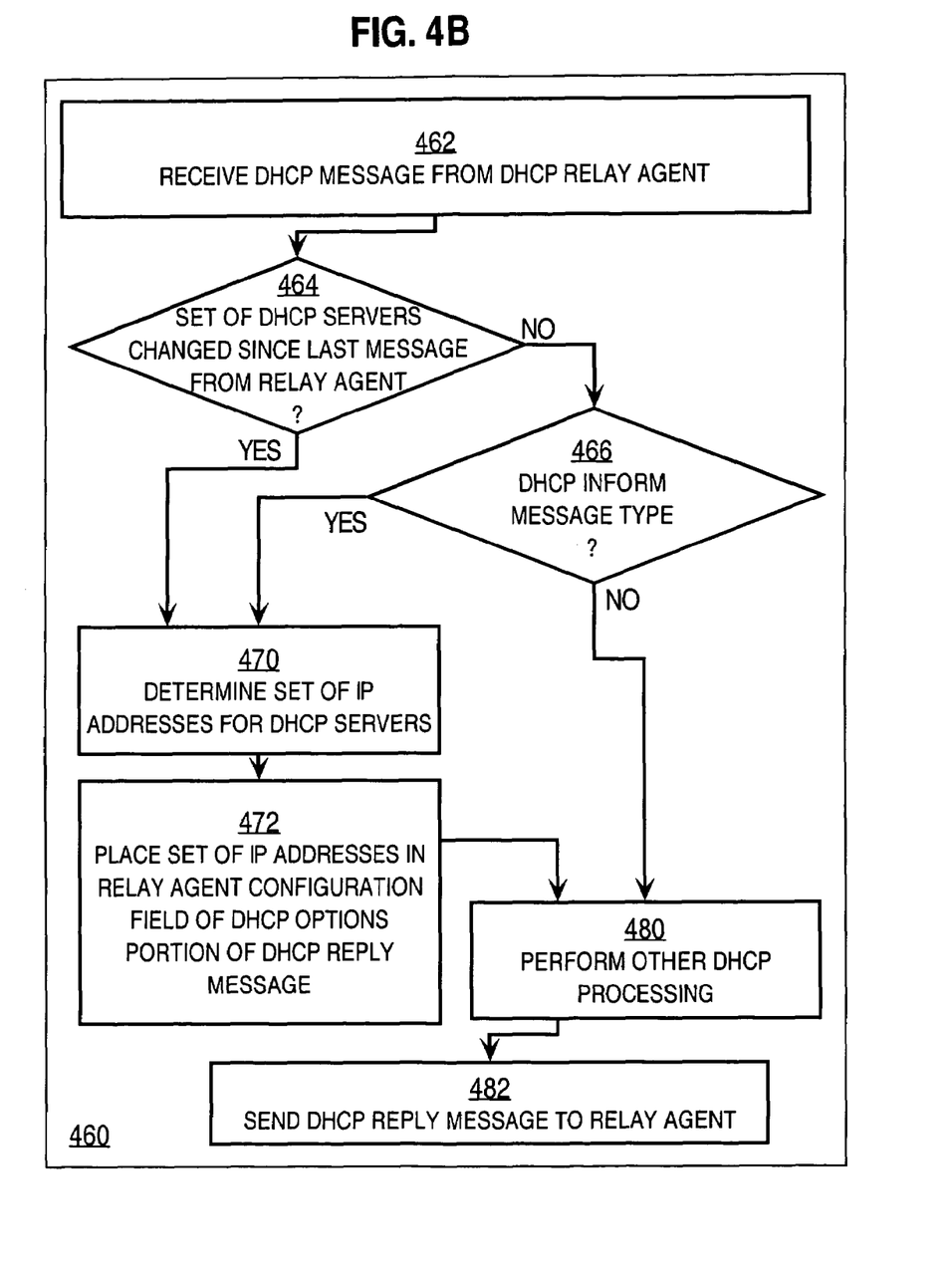
FIG. 4B is a flow diagram that illustrates an embodiment of a method for configuring a relay process of a host configuration protocol at a host configuration server.

FIG. 4A and FIG. 4B are flow diagrams that illustrate an embodiment of a method for configuring a relay process of a host configuration protocol in the context of DHCP. Although steps are depicted in FIG. 4A and FIG. 4B in a particular order, in other embodiments the steps may be performed in a different order or overlapping in time. In other embodiments, the steps may be performed in the context of other configuration protocols.

3.1 Method at Host Configuration Relay Process

FIG. 4A is a flow diagram that illustrates an embodiment 410 of a method for configuring a relay process of a host configuration protocol at the relay agent.

In step 412, the relay agent broadcasts a DHCPINFORM message. The DHCPINFORM message indicates that the relay agent is requesting information about the DHCP servers, including information about the IP addresses of those servers. For example, DHCP relay agent 103 sends broadcast 322 including a DHCPINFORM message to host 110a and other network elements 106. In many embodiments, this step is performed during initialization procedures that occur when the relay agent begins execution on a device, such as a router. This step may be omitted when the relay agent is already operating at the time that a change occurs in the set of devices that host DHCP servers. Such changes include deleting all DHCP servers on a host, or starting the first DHCP server on a host.

In step 414, the relay agent receives a DHCPACK message from a DHCP server. For example, DHCP relay agent 103 receives unicast 324 with DHCPACK message from server 110a. During initialization procedures that occur when the relay agent begins execution on a device, such as a router, step 414 is performed in response to step 412. Step 414 is also performed, but not in response to step 412, in embodiments in which step 412 is omitted, e.g., in embodiments in which the relay agent is already operating at the time that a change occurs in the set of devices that host DHCP servers.

In step 416, the relay agent determines whether the DHCPACK message received in step 414 includes data in the relay agent configuration option 240. If the option 240 includes data that indicates addresses, control passes to step 420. If option 240 is omitted, or if the field is present but has no address data, then control passes to step 430.

In step 420, the addresses indicated by the data in relay agent configuration option 240 are stored as data in a DHCP server address data structure. For example, relay agent 103 stores, into DHCP server address data structure 105, addresses of hosts 110a, 110b, 110c from the relay agent configuration option 240. Control then passes to step 440.

In step 440, the relay agent performs other operations according to its protocol. For example, the DHCP relay agent 103 performs processing and forwarding DHCPDISCOVER messages from DHCP clients to one or more of the DHCP servers on one or more hosts whose addresses are in the DHCP server address data structure.

If it is determined in step 416 that option 240 is omitted, or if the field is present but has no addresses, then control passes to step 430. In step 430, the relay agent determines the source address of the server that sent the DHCPACK message. For example, DHCP relay agent 103 determines that the DHCPACK message was sent from a DHCP server at the IP address of host 110a based on the data in source field 204. In step 430, the relay agent also determines whether the source address is among the addresses in the DHCP server address data structure. If so, control passes to step 440 to continue with normal DHCP relay agent operations. If not, control passes to step 432. For example, if the DHCP server address data structure 105 includes no data indicating addresses, such as during initialization procedures of the relay agent 103, then control passes to step 432.

In step 432, the source address is added to the DHCP server address data structure, and control passes to step 440 to continue DHCP relay agent operations. For example, DHCP relay agent 103 adds, into the DHCP server address data structure 105, data that indicates the address of host 110a, and then continues with DHCP relay agent operations.

If every DHCP server sends a DHCPACK message with no relay agent configuration option 240, then step 432 is repeated for each server, and the DHCP server address data structure is eventually filled with data indicating addresses of all hosts for those DHCP servers. If even one DHCP server sends a DHCPACK message with a relay agent configuration option 240, then the DHCP server address data structure is immediately filled with data indicating the addresses of all hosts for all DHCP servers on the network.

In some embodiments, after a device stops hosting a DHCP server, an unsolicited DHCPACK message is received in step 414 with data in the relay agent configuration option 240, which indicates a revised set of addresses that excludes the address of the device that no longer hosts a DHCP server. The steps of embodiment 410 then serve to update the DHCP server address data structure at the receiving relay agent.

3.2 Method at Host Configuration Server

FIG. 4B is a flow diagram that illustrates an embodiment 460 of a method for configuring a relay process of a host configuration protocol at a host configuration server.

In step 462, a DHCP server receives a DHCP message from a relay agent. For example, DHCP server 112a receives from DHCP relay agent 103 a DHCPDISCOVER message in unicast 332, or a DHCPINFORM message in broadcast 322. For purposes of illustration, the DHCP message is assumed to be a DHCPINFORM message from new relay agent 103 on new router 102 for new LAN 120.

In step 464 the DHCP server determines whether a set of hosts for the DHCP servers on the network have changed since the last message from this DHCP relay agent. In some embodiments step 464 is omitted and replaced with a determination of whether a predetermined schedule indicates it is time for sending the addresses of hosts of DHCP servers to any or all relay agents. If so control passes to step 470. If not, control passes to step 466.

For example, if host 110c for DHCP server 112c has been added to network 100 since the last DHCP message from relay agent 103, then control passes to step 470. For purposes of illustration, it has been assumed that DHCP relay agent is new and did not formerly communicate with DHCP server 112a; thus control passes to step 466.

In step 466, the DHCP server determines whether the DHCP message received in step 462 is a DHCPINFORM message. If not, then control passes to step 480, to continue other DHCP server operations. If the DHCP message received in step 462 is a DHCPINFORM message, then control passes to step 470.

In step 470, the DHCP server determines a set of addresses for the DHCP servers on the network. For example, DHCP server 112a determines the addresses for hosts of DHCP servers on network 100. Any method may be used. In some embodiments, the set of addresses is stored with the DHCP server based on entries directly input by a network administrator. In some embodiments, the DHCP server stores data indicating the set of IP addresses received from a central network management system based on a predefined schedule, or based on one or more events, such as changes to the number or addresses of one or more hosts for DHCP servers. For example, in some embodiments, when a device no longer hosts a DHCP server, the set of addresses at one or more remaining DHCP servers is revised to exclude the address of that host.

In either case, during step 470, the DHCP server determines the set of addresses based on the stored data. In some embodiments, in which every DHCP server responds to a DHCPINFORM message, step 470 may be omitted.

In step 472, data that indicates the set of one or more DHCP servers on the network is included in a DHCPACK message and control passes to step 480. In some embodiments, data that indicates the set of one or more addresses of DHCP servers on the network are inserted into the relay agent configuration option 240.

In some embodiments, in which every DHCP server responds to a DHCPINFORM message, the set of addresses are not written to a relay agent configuration option 240 during step 472. Instead, the address of the DHCP server that is placed in the source field 204 indicates the address of the DHCP server that is responding.

In some embodiments, step 472 includes determining whether the set of addresses includes only one address, which is the address of the host of the DHCP server that received the message in step 462. If so, the set of addresses are not written to a relay agent configuration option 240 during step 472; instead the address of the DHCP server that is placed in the source field 204 indicates the address of the DHCP servers.

In step 480, the DHCP server performs other DHCP operations, if any. For example, the DHCP server determines the configuration information for terminal 124 based on a request received in a DHCPDISCOVER message. Control then passes to step 482.

In step 482, the DHCPACK message is sent to the relay agent that sent the DHCP message received during step 462. For example, a DHCPACK message is sent to DHCP relay agent 103 in unicast 324 or unicast 334.

In some embodiments, the DHCP server is not modified to perform steps 464, 466, 470 and 472; instead, the DHCP server simply performs other DHCP server processing in step 480. Such servers do not include the relay agent configuration option 240 in any DHCPACK message. The DHCP relay agent infers the address of the unmodified DHCP server from the source field 204 of the DHCPACK message.

In some embodiments, step 464 is omitted and steps 462 and 466 are skipped when the set of hosts for DHCP server changes. When a change occurs in the set of hosts for DHCP servers, the set of addresses at one or more remaining DHCP servers is revised, and an unsolicited DHCPACK message is sent to every relay agent on the network with the revised set of addresses indicated by data in the relay agent configuration option 240. According to the steps shown in FIG. 4A, the relay agent is then reconfigured with the new set of addresses for the DHCP servers on the network.

4.0 Implementation Mechanisms—Hardware Overview

Figure 5:
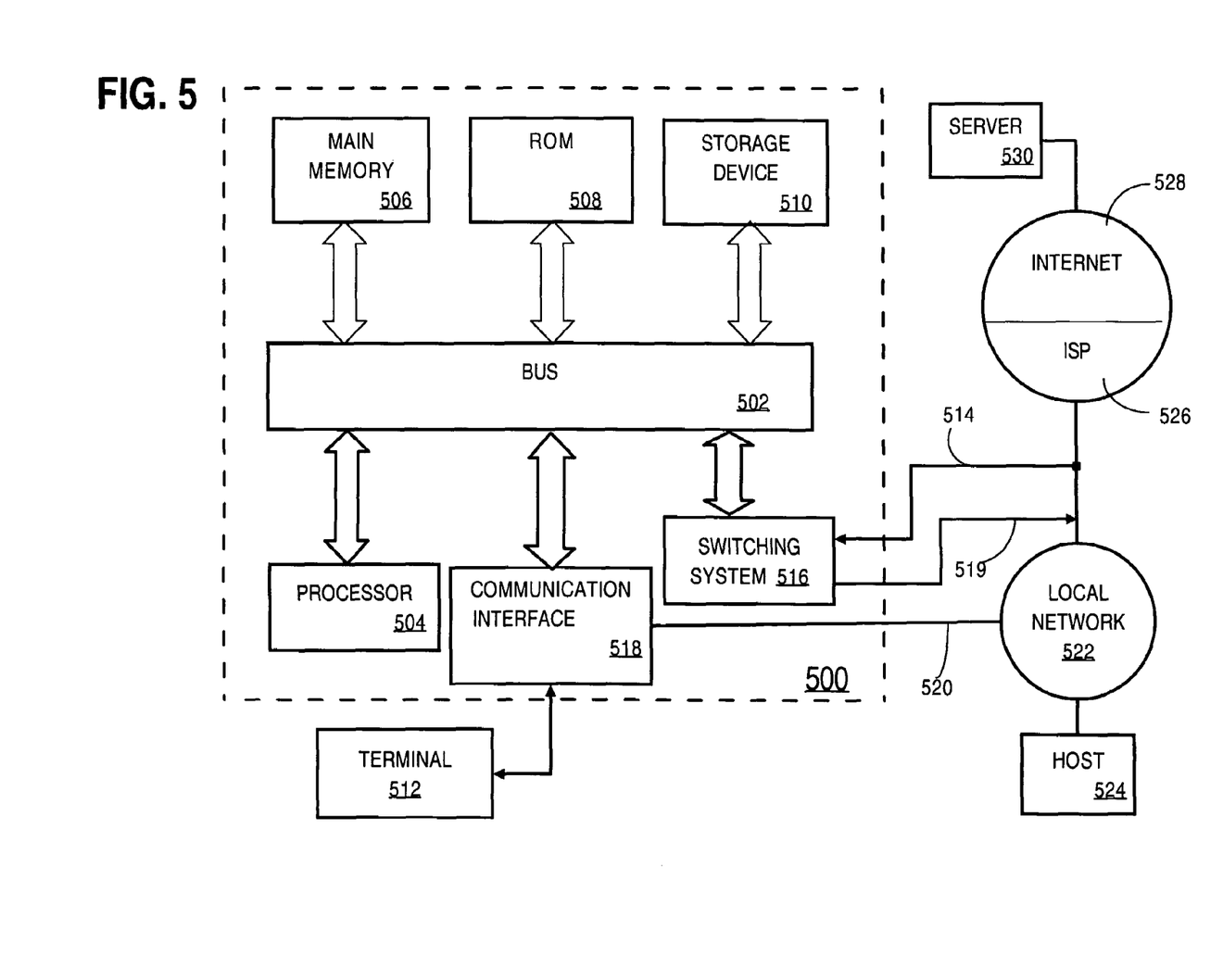
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for configuring relay agents for dynamically configuring hosts for network communications. According to one embodiment of the invention, configuration of relay agents is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a relay agent as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus hosting a Dynamic Host Control Protocol (DHCP) relay agent, comprising:
  a network interface that is coupled to a network for communicating one or more packet flows therewith;
  a processor;
  one or more stored sequences of instructions which, when executed by the processor, cause the processor to perform:
    at the Dynamic Host Control Protocol (DHCP) relay agent:
      creating a DHCP information request message;
      sending the DHCP information request message to the network;
      receiving, in response to the DHCP information request message, a DHCP acknowledgment message comprising a DHCP configuration option field that contains a plurality of network addresses of two or more DHCP servers in the network;
      storing the plurality of network addresses of the DHCP servers;
      receiving a DHCP discovery message from a DHCP client on a host coupled to the apparatus;
      sending the DHCP discovery message to one or more of the DHCP servers identified by the stored network addresses;
      receiving one or more offers of network addresses from the one or more DHCP servers;
      sending to the DHCP client a DHCP response message comprising one of the offers of network addresses.

2. The apparatus of claim 1, wherein the sequences of instructions comprise further instructions which when executed cause receiving a DHCP acknowledgment message comprising a source address field that contains one network address of one DHCP server in the network.

3. The apparatus of claim 1, wherein a DHCP message type of the DHCP information request message is DHCPINFORM and wherein the DHCP message type of the DHCP acknowledgment message is DHCPACK.

4. The apparatus of claim 1, wherein the sequences of instructions comprise further instructions which when executed cause receiving a second DCHP acknowledgment message and updating the stored plurality of network addresses of the DHCP servers using updated network addresses in a configuration option field of the second DHCP acknowledgment message.

5. The apparatus of claim 1, wherein the sequences of instructions comprise further instructions which when executed cause receiving a second DCHP acknowledgment message and updating the stored plurality of network addresses of the DHCP servers using a source address value in a source address field of the second DHCP acknowledgment message.

6. An apparatus, comprising:
  an input network interface and an output network interface that are coupled to a network for communicating one or more packet flows therewith;

a switching system coupled to the interfaces and configured to switch information traffic arriving on the input network interface to the output network interface;
a processor;
one or more stored sequences of instructions which, when executed by the processor, cause the processor to perform:
receiving, from a DHCP relay agent, a DHCP information request message;
creating, in response to the DHCP information request message, a DHCP acknowledgment message comprising a DHCP configuration option field that contains a plurality of network addresses of two or more DHCP servers that are in the network and coupled to the apparatus;
sending the DHCP acknowledgement message to the DHCP relay agent;
receiving a DHCP discovery message from the DHCP relay agent;
sending the DHCP discovery message to one or more of the DHCP servers that are coupled to the apparatus;
receiving one or more offers of network addresses from the one or more DHCP servers;
sending to the DHCP relay agent a DHCP response message comprising one of the offers of network addresses.

7. The apparatus of claim 6, wherein the sequences of instructions comprise further instructions which when executed cause the processor to perform:
determining whether a set of the DHCP servers has changed since a previous time that the DHCP acknowledgment message was sent; and
performing the creating and sending only when the set of DHCP servers has changed.

8. The apparatus of claim 6, wherein the sequences of instructions comprise further instructions which when executed cause sending a DHCP acknowledgment message comprising a source address field that contains one network address of one DHCP server in the network.

9. The apparatus of claim 6, wherein a DHCP message type of the DHCP information request message is DHCPINFORM and wherein the DHCP message type of the DHCP acknowledgment message is DHCPACK.

10. The apparatus of claim 6, wherein the sequences of instructions comprise further instructions which when executed cause sending a second DCHP acknowledgment message comprising using updated network addresses in a configuration option field of the second DHCP acknowledgment message.

11. The apparatus of claim 6, wherein the sequences of instructions comprise further instructions which when executed cause sending a second DCHP acknowledgment message comprising a source address value of one DHCP server in a source address field of the second DHCP acknowledgment message.

12. A method performed at an apparatus hosting a Dynamic Host Control Protocol (DHCP) relay agent, the apparatus comprising a processor and a network interface coupled to a network for communicating one or more packet flows therewith, the method comprising:
creating by the DHCP agent, a DHCP information request message;
sending from the DHCP agent, the DHCP information request message to the network;
receiving at the DHCP agent, in response to the DHCP information request message, a DHCP acknowledgment message comprising a DHCP configuration option field that contains a plurality of network addresses of two or more DHCP servers in the network;
storing by the DHCP agent, the plurality of network addresses of the DHCP servers;
receiving at the DHCP agent, a DHCP discovery message from a DHCP client on a host coupled to the apparatus;
sending from the DHCP agent, the DHCP discovery message to one or more of the DHCP servers identified by the stored network addresses;
receiving at the DHCP agent, one or more offers of network addresses from the one or more DHCP servers;
sending from the DHCP agent to the DHCP client a DHCP response message comprising one of the offers of network addresses.

13. The method of claim 12, further comprising receiving a DHCP acknowledgment message comprising a source address field that contains one network address of one DHCP server in the network.

14. The method of claim 12, wherein a DHCP message type of the DHCP information request message is DHCPINFORM and wherein the DHCP message type of the DHCP acknowledgment message is DHCPACK.

15. The method of claim 12, further comprising receiving a second DCHP acknowledgment message and updating the stored plurality of network addresses of the DHCP servers using updated network addresses in a configuration option field of the second DHCP acknowledgment message.

16. The method of claim 12, further comprising receiving a second DCHP acknowledgment message and updating the stored plurality of network addresses of the DHCP servers using a source address value in a source address field of the second DHCP acknowledgment message.

17. A method performed at an apparatus comprising an input network interface and an output network interface coupled to a network for communicating one or more packet flows therewith, a switching system coupled to the interfaces and configured to switch information traffic arriving on the input network interface to the output network interface, and a processor, the method comprising:
receiving, from a DHCP relay agent, a DHCP information request message;
creating, in response to the DHCP information request message, a DHCP acknowledgment message comprising a DHCP configuration option field that contains a plurality of network addresses of two or more DHCP servers that are in the network and coupled to the apparatus;
sending the DHCP acknowledgement message to the DHCP relay agent;
receiving a DHCP discovery message from the DHCP relay agent;
sending the DHCP discovery message to one or more of the DHCP servers that are coupled to the apparatus;
receiving one or more offers of network addresses from the one or more DHCP servers;
sending to the DHCP relay agent a DHCP response message comprising one of the offers of network addresses.

18. The method of claim 17, further comprising:
determining whether a set of the DHCP servers has changed since a previous time that the DHCP acknowledgment message was sent; and performing the creating and sending only when the set of DHCP servers has changed.

19. The method of claim 17, further comprising: sending a DHCP acknowledgment message comprising a source address field that contains one network address of one DHCP server in the network.

20. The method of claim 17, wherein a DHCP message type of the DHCP information request message is DHCPINFORM and wherein the DHCP message type of the DHCP acknowledgment message is DHCPACK.

21. The method of claim 17, further comprising: sending a second DCHP acknowledgment message comprising using updated network addresses in a configuration option field of the second DHCP acknowledgment message.

22. The method of claim 17, further comprising: sending a second DCHP acknowledgment message comprising a source address value of one DHCP server in a source address field of the second DHCP acknowledgment message.

23. One or more volatile or non-volatile non-transitory computer-readable media storing one or more instructions that, when executed by one or more computing devices, cause performance of, at a Dynamic Host Control Protocol (DHCP) relay agent, the steps of:

creating by the DHCP agent, a DHCP information request message;

sending from the DHCP agent, the DHCP information request message to the network;

receiving at the DHCP agent, in response to the DHCP information request message, a DHCP acknowledgment message comprising a DHCP configuration option field that contains a plurality of network addresses of two or more DHCP servers in the network;

storing by the DHCP agent, the plurality of network addresses of the DHCP servers;

receiving at the DHCP agent, a DHCP discovery message from a DHCP client on a host coupled to the apparatus;

sending from the DHCP agent, the DHCP discovery message to one or more of the DHCP servers identified by the stored network addresses;

receiving at the DHCP agent, one or more offers of network addresses from the one or more DHCP servers;

sending from the DHCP agent to the DHCP client a DHCP response message comprising one of the offers of network addresses.

24. The one or more volatile or non-volatile non-transitory computer-readable media of claim 23, wherein the instructions, when executed by the one or more computing devices, further cause performance of:

receiving a DHCP acknowledgment message comprising a source address field that contains one network address of one DHCP server in the network.

25. The one or more volatile or non-volatile non-transitory computer-readable media of claim 23, wherein a DHCP message type of the DHCP information request message is DHCPINFORM and wherein the DHCP message type of the DHCP acknowledgment message is DHCPACK.

26. The one or more volatile or non-volatile non-transitory computer-readable media claim 23, wherein the instructions, when executed by the one or more computing devices, further cause performance of:

receiving a second DCHP acknowledgment message and updating the stored plurality of network addresses of the DHCP servers using updated network addresses in a configuration option field of the second DHCP acknowledgment message.

27. The one or more volatile or non-volatile non-transitory computer-readable media of claim 23, wherein the instructions, when executed by the one or more computing devices, further cause performance of:

receiving a second DCHP acknowledgment message and updating the stored plurality of network addresses of the DHCP servers using a source address value in a source address field of the second DHCP acknowledgment message.

28. One or more volatile or non-volatile non-transitory computer-readable media storing one or more instructions that, when executed by a computing devices, cause the computing device to perform the steps of:

receiving, from a DHCP relay agent, a DHCP information request message;

creating, in response to the DHCP information request message, a DHCP acknowledgment message comprising a DHCP configuration option field that contains a plurality of network addresses of two or more DHCP servers that are in the network and coupled to the first DHCP server;

sending the DHCP acknowledgement message to the DHCP relay agent;

receiving a DHCP discovery message from the DHCP relay agent;

sending the DHCP discovery message to one or more of the DHCP servers that are coupled to the first DHCP server;

receiving one or more offers of network addresses from the one or more DHCP servers;

sending to the DHCP relay agent a DHCP response message comprising one of the offers of network addresses.

29. The one or more volatile or non-volatile non-transitory computer-readable media of claim 28, wherein the instructions, when executed by the one or more computing devices, further cause performance of:

determining whether a set of the DHCP servers has changed since a previous time that the DHCP acknowledgment message was sent; and performing the creating and sending only when the set of DHCP servers has changed.

30. The volatile or non-volatile non-transitory computer-readable media of claim 28, wherein the instructions, when executed by the one or more computing devices, further cause performance of: sending a DHCP acknowledgment message comprising a source address field that contains one network address of one DHCP server in the network.

31. The one or more volatile or non-volatile non-transitory computer-readable media of claim 28, wherein a DHCP message type of the DHCP information request message is DHCPINFORM and wherein the DHCP message type of the DHCP acknowledgment message is DHCPACK.

32. The one or more volatile or non-volatile non-transitory computer-readable media of claim 28, wherein the instructions, when executed by the one or more computing devices, further performance of:

sending a second DCHP acknowledgment message comprising using updated network addresses in a configuration option field of the second DHCP acknowledgment message.

33. The one or more volatile or non-volatile non-transitory computer-readable media of claim 28, wherein the instructions, when executed by the one or more computing devices, further cause performance of:

sending a second DCHP acknowledgment message comprising a source address value of one DHCP server in a source address field of the second DHCP acknowledgment message.

* * * * *